United States Patent [19]
Wiessner

[11] 3,788,202
[45] Jan. 29, 1974

[54] VIEWFINDER FOR SINGLE LENS REFLEX CAMERAS

[75] Inventor: Willi Wiessner, Wetzlar, Germany

[73] Assignee: Ernst Leitz GmbH, Wetzlar, Germany

[22] Filed: Aug. 22, 1972

[21] Appl. No.: 282,702

[30] Foreign Application Priority Data
Aug. 27, 1971 Germany............... P 21 42 888.6

[52] U.S. Cl. ............... 95/11 V, 88/1.5 R, 95/42
[51] Int. Cl. ............................................ G03b 19/14
[58] Field of Search ................. 95/11 V, 42; 88/1.5

[56] References Cited
UNITED STATES PATENTS

| | | | |
|---|---|---|---|
| 3,651,735 | 3/1972 | Hiruma | 95/11 V |
| 2,754,735 | 7/1956 | Meyer | 95/42 |
| 1,276,733 | 8/1918 | Davis | 95/42 |
| 1,298,582 | 3/1919 | Shafer et al. | 95/42 |
| 2,066,605 | 1/1937 | Billing | 95/42 X |
| 3,590,683 | 7/1971 | Hiruma | 95/42 X |
| 3,643,573 | 2/1972 | Hiruma | 95/42 |

Primary Examiner—Samuel S. Matthews
Assistant Examiner—E. M. Bero
Attorney, Agent, or Firm—Krafft & Wells; Gilbert L. Wells

[57] ABSTRACT

A single lens reflex camera comprising a penta prism arranged above the reflex mirror is provided on the light emerging side of the prism with a light ray reflecting means. The reflecting means is movably mounted so that the light rays emerging from the prism may be directed into at least two different directions. It is thereby achieved that the camera may be used with at least two different viewing directions, e.g. mainly with a horizontal and with a vertical viewing direction.

10 Claims, 6 Drawing Figures

VIEWFINDER FOR SINGLE LENS REFLEX CAMERAS

BACKGROUND OF THE INVENTION

The invention relates to SLR cameras, more particular to the viewfinder system thereof.

SLR cameras are usually provided with penta prisms above the reflex mirror in order to achieve a viewing direction which is in parallel to the optical axis of the picture taking lens. This direction is in the following description called the horizontal direction.

On some occasions, however, a vertical or an inclined viewing direction is preferred. It is, thus, desirable for the user of such a camera to have a choice between a plurality of viewing directions, at least between two such directions. Therefore, accessory devices are already known which may be attached to the rear side of the viewfinder and which change the viewing direction, either from horizontal to vertical or inclined, or vice versa. Further, SLR cameras are already known which have a removable penta prism so that the camera may be used either with penta prism which gives a horizontal viewing direction, or without prism which gives a vertical viewing direction.

It is, however, a disadvantage of these accessory devices and removable penta prisms that they must be carried and handled separately from the camera housing when dismounted.

It is therefore an object of the invention to provide a viewfinder for an SLR camera having different viewing directions without the necessity of attaching accessory devices to the camera.

SUMMARY OF THE INVENTION

The above stated object is attained by arranging a movable light reflecting means immediately adjacent the light emerging side of the penta prism. The light reflecting means may be moved between at least two positions which define at least two different viewing directions.

The light reflecting means may be a mirror or a prism which is movable by means of a handle arranged at the outside of the camera. Preferably, an image inverting prism may be used in order to obtain an upright image in each of the different viewing directions. Such a prism may either be a penta prism or a Schmidt-prism.

The use of a Schmidt-prism has proven particularly advantageous because this prism type comprises a front surface and a rear surface which extend in parallel to the light emerging surface of the camera penta prism. Thus, in order to switch from one viewing direction to the other, the prism needs only to be moved in a rectilinear vertical direction. If the viewing direction is to be the horizontal one, the prism just has the function of a plane parallel glass plate.

In order to adjust the viewfinder to different viewing directions the light reflecting means may either be pivoted or displaced rectilinearly. In one of these positions the reflecting surface is moved out of the path of the light rays which emerge from the camera penta prism. However, it is also possible to have the reflecting surface constantly in the path of the light rays and only to vary the angular position of this surface. By arranging two mirrors and by combining them by means of a differential gearing it is possible to obtain viewing directions under any desired angle. Such an arrangement, however, would be rather complicated. Therefore, a viewfinder is preferred which can only be adjusted to two different viewing directions.

In such a simplified device an eye lens mounted rigidly in the camera housing may be arranged in the light path of each viewing direction. For changing from one viewing direction to the other only the reflecting means have to be moved. But it is equally possible to use one eyelens which, however, must be moved or pivoted together with the light reflecting means.

Further, it is suggested to provide a light blocking means and to connect the latter to the movable light reflecting means for automatically blocking the light from entering into the viewing aperture which is not used at the moment. This serves to prevent any feed back of light into the camera housing.

Still further, it is suggested to mount the light reflecting means together with the eyelens and the camera penta prism in a separate housing and to attach the housing exchangeably to the camera body. The housing may then be exchanged for a like housing without light reflecting means. This enables the manufacturer to assemble the camera in the factory according to the particular request of the customer.

BRIEF DESCRIPTION OF THE DRAWINGS

The invention will be more readily comprehended from the following description when taken in conjunction with the appending drawings, wherein.

DESCRIPTION OF THE PREFERRED EMBODIMENT

Figure 1:
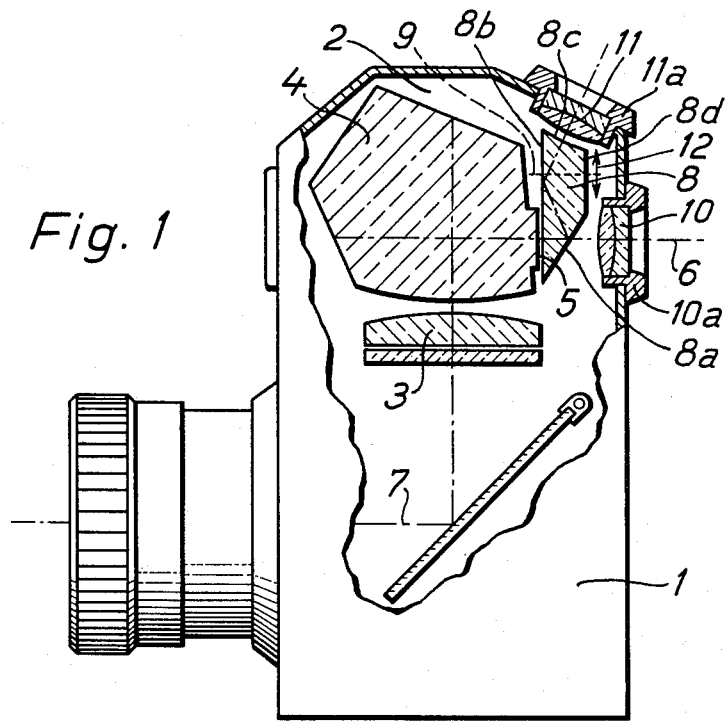
FIG. 1 is a sectional view of a viewfinder in a SLR camera having two viewing directions.

Referring now to the drawings, a viewfinder housing 2 is connected to the camera body and covers a collecting optical element and a penta prism 4. Through the rear surface 5 of the penta prism emerge light rays 6 (only the central ray being shown) in parallel to the optical axis 7 of the picture taking lens. Immediately opposite the rear surface 5 there is arranged a Schmidt-prism 8 wherein the light rays are reflected twice, namely from the surfaces 8a and 8b. The Schmidt-prism has a light emerging surface 8c and immediately adjacent thereto two surfaces 8b and 8d which extend perpendicularly to the plane of drawing of FIG. 1. Therefore, in certain portions around the dotted line 9 the prism also constitutes a plane parallel glass plate and may be used as such.

In the housing 2 there are mounted a first eyelens 10 and second eyelens 11 by means of their respective mounts 10a and 11a. The eyelens 10 is arranged on the level of the light rays 6 emerging from the penta prism 4. The eyelens 11 is positioned opposite to the light emerging surface 8c of the Schmidt-prism 8 and provides an ocular for a viewing direction 75° different from the horizontal direction.

By means of a manually operable setting means (not shown) the Schmidt-prism 8 may be displaced in the direction of the doubled-headed arrow 12. The prism may occupy the position shown in the drawing wherein the light rays 6, after a first and a second reflection from the surfaces 8a and 8b respectively, emerge from the surface 8c and are directed to the 75° eyelens 1. The prism may, however, also occupy a position wherein the dotted line 9 coincides with the dash-dotted line representing the middle light ray 6. In this position the Schmidt prism 8 functions as a plane parallel glass plate allowing the light rays to travel without any reflection to the eyelens 10 for a horizontal viewing direction.

Figure 2:
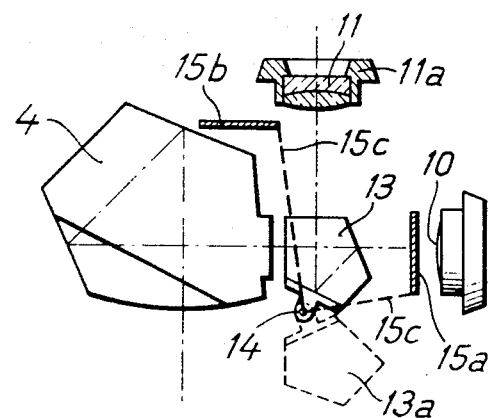
FIG. 2 is an embodiment of the invention wherein a penta prism is used as a light reflecting means.

In the embodiment shown in FIG. 2 there is arranged a second penta prism 13 behind the penta prism 4 in the direction of light travel. The penta prism 13 is pivotable about an axis 14 and may be pivoted completely out of the path of the light rays emerging from the penta prism. This position is shown in the dotted lines 13a.

In addition, there is provided a first and a second light blocking plate 15a and 15b respectively for covering the eyelens which at the moment is not used for viewing. This prevents any feed back of light through the not-used eyelens. The dotted lines 15c indicate that the plates 15b are mechanically linked to the penta prism 13 and are brought into the respective light path in accordance with the pivoting of the prism. Similar light blocking plates may also be provided in the embodiment shown in the FIG. 1.

Figure 3:
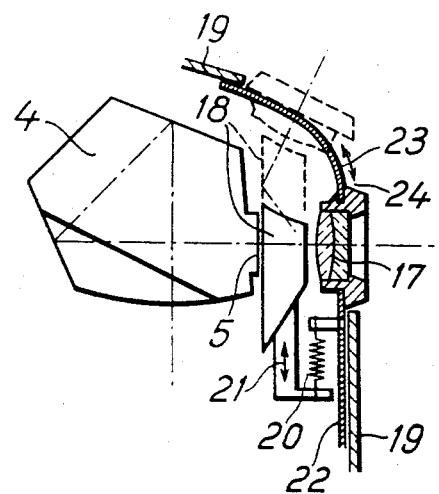
FIG. 3 shows part of a viewfinder having only one movable eyelens.

The embodiment shown in FIG. 3 comprises only one eyelens 17. The arrangement of the light reflecting means (Schmidt-prism 18) is similar to the arrangement in FIG. 1. The prism is guided parallel to the light emerging surface 5 of the penta prism 4 in a guiding means 19. The carrier of the Schmidt-prism 18 is linked to the eyelens 17 by coupling means 20; the eyelens being movable along a curve as indicated by the double-headed arrow 21. This is accomplished by means of the elements 22, 23 which, at the same time, cover the opening 24 in the camera housing.

Figure 4A:
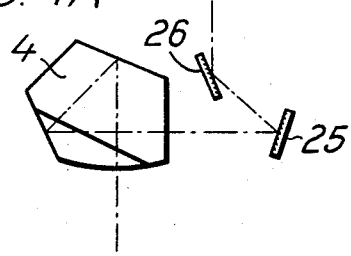
FIGS. 4A–4C are schematic views of a viewfinder having a pair of mirrors as the light reflecting means, which is adjustable to three different viewing directions.
Figure 4B:
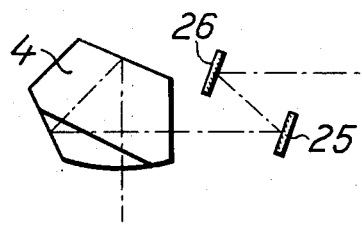
Figure 4C:
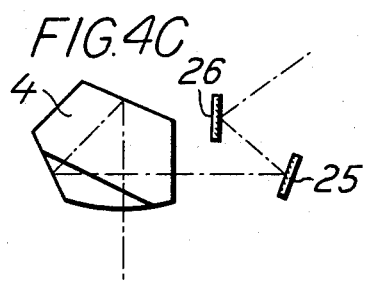

As shown in FIGS. 4A–4C the light reflecting means may be also be a pair of mirrors comprising the mirrors 25 and 26. The angular position of the mirror 26 and also the position of the mirror 25 relative to the rear surface of the penta prism 4 is continuously variable so that more than two viewing directions are achieved by altering the position of the mirrors, as indicated by the FIGS. 4A; 4B; 4C.

What is claimed is:

1. A viewfinder system for single lens reflex cameras having a housing, a picture taking lens mounted over an aperture in said housing, said picture taking lens receiving light rays and having an optical axis, a reflex mirror mounted in said housing along said optical axis and reflecting said light rays having an a first pentaprism mounted in said housing above said reflex mirror along said reflected optical axis, said pentaprism having a light emerging surface from which said optical axis exits, light reflecting means movably mounted and adjustable to at least two alternate positions which define different viewing directions of the viewfinder system in said housing along said optical axis exiting from said light emerging surface, said housing having at least two viewing opeinings corresponding to said different viewing directions and ocular means on said housing along said optical axis reflected by said light reflecting means for viewing an upright and unreversed image of an object being photographed.

2. A viewfinder as claimed in claim 1, wherein said light reflecting means is a prism.

3. A viewfinder as claimed in claim 1, wherein said light reflecting means is a second pentaprism.

4. A viewfinder as claimed in claim 1, wherein said light reflecting means is a Schmidt-prism which reflects the light rays at an angle of 75°.

5. A viewfinder as claimed in claim 3, wherein said second pentaprism is mounted pivotably.

6. A viewfinder as claimed in claim 4, wherein the Schmidt prism is rectilinearly displaceable in a vertical direction.

7. A viewfinder as claimed in claim 1, wherein a separate ocular is arranged in each viewing direction.

8. A viewfinder as claimed in claim 1 and wherein said ocular means is attached to the light reflecting means so as to be movable therewith.

9. A viewfinder as claimed in claim 1 and further comprising light blocking means for blocking the opening in the camera housing not used for viewing, said light blocking means being attached to the light reflecting means for joint movement therewith.

10. A viewfinder as claimed in claim 9, wherein said light blocking means is combined with said ocular means to form one unit.

* * * * *